United States Patent [19]

Suzuki et al.

[11] Patent Number: 5,412,941
[45] Date of Patent: May 9, 1995

[54] DEVICE FOR DETERMINING DETERIORATION OF A CATALYTIC CONVERTER FOR AN ENGINE

[75] Inventors: Katsuhiro Suzuki, Toyota; Katsuhiko Hayashi, Nagoya; Akira Itoh, Toyota, all of Japan

[73] Assignee: Toyota Jidosha Kabushiki Kaisha, Aichi, Japan

[21] Appl. No.: 25,640

[22] Filed: Mar. 2, 1993

[30] Foreign Application Priority Data

Mar. 23, 1992 [JP] Japan .................. 4-064883

[51] Int. Cl.⁶ ............................................. F01N 3/20
[52] U.S. Cl. ........................................ 60/276; 60/277
[58] Field of Search ................................ 60/276, 277

[56] References Cited

U.S. PATENT DOCUMENTS

| 4,739,614 | 4/1988 | Katsuno et al. |
| 5,119,628 | 6/1992 | Uema et al. |
| 5,134,847 | 8/1992 | Ogawa et al. |
| 5,267,472 | 12/1993 | Schneider ............................ 60/277 |

FOREIGN PATENT DOCUMENTS

| 3443649A1 | 11/1984 | Germany. |
| 3916467A1 | 5/1989 | Germany. |
| 63-97852 | 4/1988 | Japan. |
| 2-91440 | 3/1990 | Japan. |
| 3-57862 | 3/1991 | Japan. |
| 3-134241 | 6/1991 | Japan. |
| 2225860 | 6/1990 | United Kingdom. |

OTHER PUBLICATIONS

Clemmens et al., "Detection of Catalyst Performance Loss Using On-Board Diagnostics"; SAE Technical Paper Series No. 900062; Feb. 26–Mar. 2, 1990.

Koupal et al., "Detection of Catalyst Failure On-Vehicle Using the Dual Oxygen Sensor Method"; SAE Technical Paper Series No. 910561; pp. 135–146.

*Primary Examiner*—Douglas Hart
*Attorney, Agent, or Firm*—Oliff & Berridge

[57] ABSTRACT

A device for determining a deterioration of the catalytic converter for an engine equipped with a catalytic converter disposed in the exhaust passage and upstream and downstream air-fuel ratio sensors disposed in the exhaust passage upstream and downstream of the catalytic converter, respectively. The device also determines whether the three-way catalyst in the catalytic converter has deteriorated based on the output signal of the downstream air-fuel ratio sensor when the air-fuel ratio of the engine is feedback controlled by the output of the upstream air-fuel ratio sensor, wherein the execution of the determining operation of catalyst deterioration is prohibited when the period of the cycle of the air-fuel ratio feedback control becomes longer than a predetermined value, thereby preventing errors from accuracy in the determination.

3 Claims, 18 Drawing Sheets

DEVICE FOR DETERMINING DETERIORATION OF A CATALYTIC CONVERTER FOR AN ENGINE

BACKGROUND OF THE INVENTION

1. Field of the Invention

The present invention relates to an air-fuel ratio control device for an engine that controls an air-fuel ratio of the engine based on at least an output of an air-fuel ratio sensor disposed in the exhaust passage upstream of a three-way catalyst. More specifically, the present invention relates to such an air-fuel control device that is able to detect the deterioration of the three-way catalyst based on at least an output of an air-fuel ratio sensor disposed in the exhaust passage downstream of the three-way catalyst.

2. Description of the Related Art

An air-fuel ratio control device for controlling an air-fuel ratio of an engine by a feedback control based on an output of one air-fuel ratio sensor ($O_2$ sensor) disposed in an exhaust passage upstream of a catalytic converter is known as a single $O_2$ sensor system. The single $O_2$ sensor system is used to control the air-fuel ratio of the engine at a stoichiometric air-fuel ratio to improve the condition of exhaust emissions by utilizing the ability of the three-way catalytic converter to a maximum degree.

Also, to compensate for the individual difference among cylinders or changes due to aging of the upstream $O_2$ sensor, a double $O_2$ sensor system using two $O_2$ sensors has been developed (U.S. Pat. No. 4,739,614). In the double $O_2$ sensor system, $O_2$ sensors are disposed upstream and downstream of the catalytic converter in the exhaust passage, and the air-fuel ratio control is carried out based on the output of the downstream $O_2$ sensor as well as the output of the upstream $O_2$ sensor.

Nevertheless, even in the double $O_2$ sensor system, if the catalyst in the catalyst converter deteriorates, the condition of the exhaust emissions such as HC, CO, $NO_x$ deteriorates. Therefore, it is necessary to detect the deterioration of the catalyst accurately.

To detect the deterioration of the catalyst in the catalytic converter, various methods and devices have been proposed.

For example, Japanese Unexamined Patent Publication No. 63-97852 discloses a method for detecting the deterioration of the catalyst based on the interval of reversals of the output of the downstream $O_2$ sensor (i.e., the period of changes of the output signal of the downstream O sensor from a rich side air-fuel ratio to a lean side air-fuel ratio, or vice versa ) during air-fuel ratio feedback control based on the output of the upstream $O_2$ sensor.

It is known that the interval of reversals of the output of the downstream $O_2$ sensor during the air-fuel ratio feedback control becomes shorter when the catalyst in the catalytic converter has deteriorated. The method disclosed in Japanese Unexamined Patent Publication No. 63-97852 utilizes this phenomenon to detect the deterioration of the catalyst by counting the number of reversals of the output of the downstream $O_2$ sensor over a predetermined time period when the air-fuel ratio of the engine is feedback controlled in accordance with the output of the upstream $O_2$ sensor under predetermined operating conditions of the engine.

If the number of reversals is larger than a predetermined value (i.e., if the intervals of the output of the downstream $O_2$ sensor becomes shorter), it is determined that the catalyst has deteriorated.

In the above method, the deterioration of the catalyst is determined by detecting a reduction in an storage effect of the catalyst. That is, the catalyst has an ability to adsorb oxygen in the exhaust gas when the air-fuel ratio is in a rich side compared to the stoichiometric air-fuel ratio (i.e., the air-fuel ratio of the exhaust gas is lower than the stoichiometric air-fuel ratio), and to release the oxygen when the air-fuel ratio is in a lean side compared with the stoichiometric air-fuel ratio (i.e., the air-fuel ratio of the exhaust gas is higher than the stoichiometric air-fuel ratio). This ability, i.e., the $O_2$ storage effect of the catalyst, becomes lower as deterioration of the catalyst proceeds. In the above method, the reduction in the $O_2$ storage effect is detected by counting the number of reversals of the output of the downstream $O_2$ sensor.

The deterioration of the catalyst can be detected accurately by utilizing the $O_2$ storage effect of the catalyst provided that a period of a cycle of the air-fuel ratio feedback control is relatively short. (In this specification, the term "period of a cycle of the air-fuel ratio feedback control" means a period of oscillation of the air-fuel ratio between a rich side air-fuel ratio and a lean side air-fuel ratio when the air-fuel ratio is feedback controlled, i.e., the period represented by "T" in FIG. 1A. )

However, if the period of the cycle of the air-fuel ratio becomes relatively longer, it is difficult to determine the deterioration of the catalyst accurately by utilizing the $O_2$ storage effect.

This problem is explained in detail with reference to FIGS. 1A to 1G.

FIG. 1A shows a typical response of the air-fuel ratio of the exhaust gas upstream of the catalytic converter when the air-fuel ratio feedback control is carried out. As shown in FIG. 1A, the air-fuel ratio of the exhaust gas oscillates periodically between a rich side air-fuel ratio and a lean side air-fuel ratio so that the central value of the oscillation coincides with the stoichiometric air-fuel ratio. The period of the cycle of the air-fuel ratio feedback control, which is indicated by T in FIG. 1A, is normally relatively short (for example, approximately 0.5 seconds).

FIG. 1B shows the response curve of the output signal VOM of the upstream $O_2$ sensor when the air-fuel ratio is oscillating, as shown in FIG. 1A. The output signal VOM also oscillates between a rich side and a lean side, and the interval of the reversal of the output signal VOM is same as the period of the cycle of the air-fuel ratio feedback control (i.e., T in FIG. 1A).

FIGS. 1C and 1D show the response curves of the output signal VOS of the downstream $O_2$ sensor in this case. FIG. 1C shows the response curve when the catalyst is normal, and FIG. 1D shows the same when the catalyst has deteriorated.

If the catalyst is normal, the catalyst adsorbs surplus oxygen in the exhaust gas when the air-fuel ratio of the exhaust gas is in the lean side compared with the stoichiometric air-fuel ratio, and releases the adsorbed oxygen when the air-fuel ratio of the exhaust gas is in the rich side compared with the stoichiometric air-fuel ratio. Therefore, the air-fuel ratio of the exhaust gas downstream of the catalyst is maintained nearly constant at the mean value of the oscillation of the air-fuel ratio of the exhaust gas upstream of the catalyst (i.e., stoichiometric air-fuel ratio) though the air-fuel ratio of the exhaust gas upstream of the catalyst is oscillating. Accordingly, the output signal VOS of the downstream O$_2$ sensor reverses at a relatively longer interval as shown in FIG. 1C.

On the other hand, if the catalyst is deteriorated, since the O$_2$ storage effect of the catalyst also becomes lower, the amount of the oxygen which is adsorbed and released from the catalyst decreases. This causes the output signal VOS to oscillate at a short interval of reversals in the same manner as the output VOM of the upstream O$_2$ sensor (see FIG. 1D). Therefore, it is possible to detect the deterioration of the catalyst easily by monitoring the interval of reversals of the output signal VOS of the downstream O$_2$ sensor.

However, if the period of the cycle of the air-fuel ratio feedback control becomes longer as shown in FIG. 1E for some reason, the time period in which the air-fuel ratio of the exhaust gas upstream of the catalyst stays in the rich side or the lean side also becomes longer.

If the upstream air-fuel ratio continues to stay in the lean side after the catalyst has adsorbed the oxygen to the maximum adsorbing capacity, the catalyst does not adsorb the surplus oxygen in the exhaust gas. This causes the air-fuel ratio of the exhaust gas down stream of the catalyst to also be in lean side since the surplus oxygen is no longer adsorbed by the catalyst. Similarly, if the upstream air-fuel ratio continues to stay in the rich side still after the catalyst has released all the adsorbed oxygen, the air-fuel ratio of the exhaust gas turns to the rich side since the oxygen is no longer released from the catalyst.

Therefore, when the period of the cycle of the air-fuel ratio feedback control becomes longer (as shown in FIG. 1E), the air-fuel ratio downstream of the catalyst oscillates in a similar manner as the air-fuel ratio upstream of the catalyst, thereby causing the output VOS of the downstream O$_2$ sensor to oscillate at relatively short interval of reversals in the similar manner as the output VOM of the upstream O$_2$ sensor regardless of the deterioration of the catalyst (see FIGS. 1F and 1G). In such cases, if the determination of the deterioration of the catalyst is carried out, a normal catalyst can be erroneously determined as being deteriorated.

There are cases in which the period of the cycle of the air-fuel ratio feedback control becomes longer. For example, when the upstream O$_2$ sensor has deteriorated, the period of the cycle of the air-fuel ratio feedback control becomes longer since the response of the upstream O$_2$ sensor becomes lower. U.S. Pat. No. 5,134,847 discloses a device for determining the deterioration of the catalyst that can prevent the above mistake in determination due to the deterioration of the upstream O$_2$ sensor. The device in U.S. Pat. No. 5,134,847 monitors the condition of the upstream O$_2$ sensor, and prohibits the determining operation when the upstream O$_2$ sensor is determined as being deteriorated. The upstream O$_2$ sensor is determined as being deteriorated when the response of the upstream O$_2$ sensor becomes lower (e.g. when the period of the cycle of the oscillation of the output of the upstream O$_2$ sensor becomes longer than a predetermined value).

However, even though the upstream O$_2$ sensor has not deteriorated, the period of the cycle of the air-fuel ratio feedback control can be longer in some cases. For example, in a transition period of the sudden change in the operating conditions of the engine, such as in a sudden acceleration or a deceleration, the period of the cycle of the air-fuel ratio can be longer even though the response of the upstream O$_2$ sensor is normal. In such a transition period, the output signal VOM of the upstream O$_2$ sensor may oscillate in the rich air-fuel ratio side or the lean air-fuel ratio side only, but does not oscillate between the rich air-fuel ratio side and the lean air-fuel ratio side (See FIG. 1H). Therefore the period of the cycle of the air-fuel ratio feedback control becomes longer even though the period of the cycle of the oscillation ($T_U$ in FIG. 1H) of the output signal of the upstream O$_2$ sensor is still short.

Also, when the engine is operated under conditions in which the velocity of the exhaust gas flow in the exhaust passage becomes low, the period of the cycle of the air-fuel ratio feedback control becomes longer since the time required for exhaust gas to flow over the distance between the engine and the position of the upstream O$_2$ sensor increases.

Therefore, according to the device in U.S. Pat. No. 5,134,847, a normal catalyst can be determined as being deteriorated under such conditions.

SUMMARY OF THE INVENTION

Therefore, in view of the problems of the related art, the object of the present invention is to provide a device for accurately determining the deterioration of a three-way catalyst in a catalytic converter used in a double O$_2$ sensor system.

According to the present invention, there is provided a device for determining the deterioration of a three-way catalyst disposed in an exhaust passage of an internal combustion engine equipped with an upstream air-fuel ratio sensor disposed in the exhaust passage upstream of the three-way catalyst for detecting an air-fuel ratio of the exhaust gas upstream of the three-way catalyst, a downstream air-fuel ratio sensor disposed in the exhaust passage downstream of the three-way catalyst for detecting the air-fuel ratio of the exhaust gas downstream of the three-way catalyst, and a feedback control means for controlling the air-fuel ratio of the engine by a feedback control based on, at least, the output of the upstream air-fuel ratio sensor.

The device comprises a determining means for determining whether the three-way catalyst has deteriorated based on, at least, the output of the downstream air-fuel ratio sensor when the air-fuel ratio of the engine is controlled by the feedback control means, a condition determining means for determining that the engine operating conditions are not appropriate for the determination of the deterioration of the three-way catalyst in which the length of a period of a cycle of the feedback control of the air-fuel ratio by the feedback control means becomes larger than a value appropriate for the determination of the deterioration of the three-way catalyst, and a means for prohibiting the determination of the deterioration of the three-way catalyst when the condition detecting means determines that the engine operating conditions are not appropriate for the determination of the deterioration of the three-way catalyst.

BRIEF DESCRIPTION OF THE DRAWINGS

The present invention will be better understood from the description as set forth hereinafter, with reference to the accompanying drawings, in which.

DESCRIPTION OF THE PREFERRED EMBODIMENT

Figure 2:
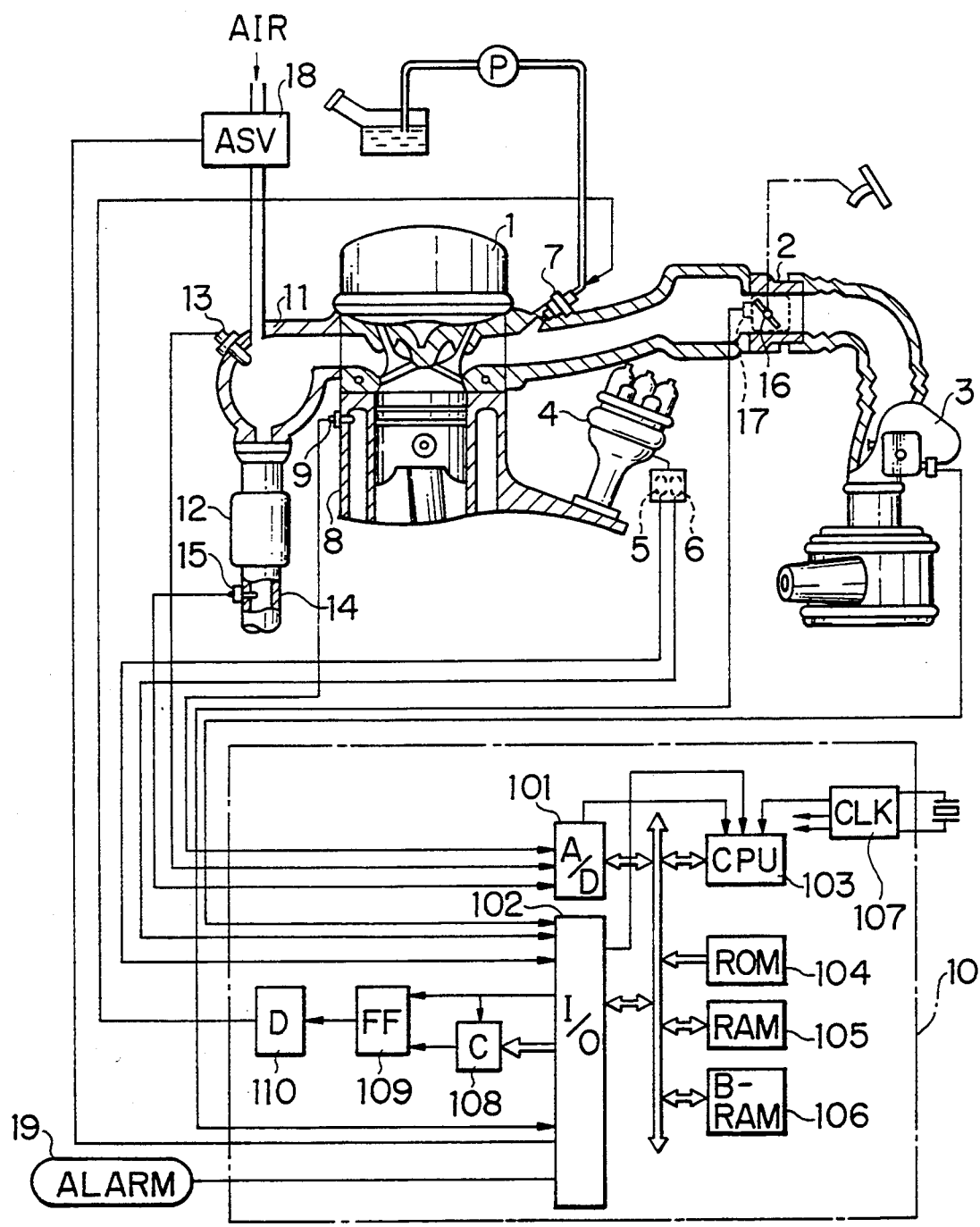
FIG. 2 is a schematic view of an internal combustion engine showing an embodiment of the present invention.

FIG. 2 schematically illustrates an embodiment of the device for determining the deterioration of the catalyst according to the present invention.

In FIG. 2, reference numeral 1 represents an internal combustion engine for an automobile. An air intake passage 2 of the engine 1 is provided with a potentiometer-type airflow meter 3 for detecting an amount of air drawn into the engine 1, and generates an analog voltage signal proportional to the amount of air flowing therethrough. The signal from the airflow meter 3 is transmitted to a multiplexer-incorporating analog-to-digital (A/D) converter 101 of the control circuit 10.

Crank angle sensors 5 and 6, for detecting the angle of the crankshaft (not shown) of the engine 1, are disposed at a distributor 4.

In this embodiment, the crank angle sensor 5 generates a pulse signal at every 720° crank angle (CA) and the crank angle sensor 6 generates a pulse signal at every 30° CA. The pulse signals from the crank angle sensors 5 and 6 are supplied to an input/output (I/O) interface 102 of the control circuit 10. Further, the pulse signal of the crank angle sensor 6 is then supplied to an interruption terminal of a central processing unit (CPU) 103.

In the intake passage 2, a fuel injection valve 7 is provided at an inlet port of each cylinder of the engine 1, for supplying pressurized fuel from the fuel system to the cylinders of the engine.

A coolant temperature sensor 9 for detecting the temperature of the coolant is disposed in a water jacket of a cylinder block 8 of the engine 1. The coolant temperature sensor 9 generates an analog voltage signal in response to the temperature THW of the coolant, and transmits this signal to the A/D converter 101 of the control circuit 10.

In the exhaust system, a three-way reducing and oxidizing catalytic converter 12 is disposed in the exhaust passage downstream of the exhaust manifold 11. The catalytic converter 12 has the O₂ storage effect and is capable of removing three pollutants in the exhaust gas, i.e., CO, HC and NO$_x$, simultaneously.

An upstream O₂ sensor 13 is provided at the exhaust manifold 11, i.e., upstream of the catalytic converter 12.

A downstream O₂ sensor 15 is disposed at an exhaust pipe 14 downstream of the catalytic converter 12.

The upstream O₂ sensor 13 and the downstream O₂ sensor 15 generate output signals corresponding to the concentration of the oxygen component in the exhaust gas.

More specifically, the O₂ sensors 13 and 15 generate output voltage signals that are changed in accordance with whether the air-fuel ratio of the exhaust gas is rich or lean, compared to the stoichiometric air-fuel ratio. The signals output by the O₂ sensors 13 and 15 are transmitted to the A/D converter 101 of the control circuit 10.

The control circuit 10, which may be constructed by a microcomputer, further comprises a central processing unit (CPU) 103, a read-only-memory (ROM) 104 for storing a main routine and interrupt routines such as a fuel injection routine, and an ignition timing routine and constants, etc., a random-access-memory (RAM) 105 for storing temporary data, a backup RAM 106, and a clock generator 107 for generating various clock signals. The backup RAM 106 is directly connected to a battery (not shown), and therefore, the content of the backup RAM 106 is preserved even when the ignition switch (not shown) is turned off.

A throttle valve 16 operated by a vehicle driver, is provided in the intake air passage 2, together with an idle switch 17 for detecting the opening of the throttle valve and generating a signal ("LL signal") when the throttle valve 16 is fully closed. This LL signal is supplied to the I/O interface 102 of the control circuit 10.

Reference 18 designates a secondary air supply valve for introducing secondary air to the exhaust manifold 11, thereby reducing the emission of HC and CO during a deceleration or an idling operation of the engine.

Reference 19 designates an alarm that is activated when the catalytic converter 12 is determined as being deteriorated.

A down counter 108, a flip-flop 109, and a drive circuit 110 are provided in the control circuit 10 for controlling the fuel injection valve 7.

When a fuel injection amount TAU is calculated in a routine, as explained later, the amount TAU is preset in the down counter 108, and simultaneously, the flip-flop 109 is set, and as a result, the drive circuit 110 initiates the activation of the fuel injection valve 7. On the other hand, the down counter 108 counts up the clock signal from the clock generator 107, and finally, a logic "1" signal is generated from the terminal of the down counter 108, to reset the flip-flop 109, so that the drive circuit 110 stops the activation of the fuel injection valve 7, whereby an amount of fuel corresponding to the fuel injection amount TAU is supplied to the cylinders.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q from the airflow meter 3 and the coolant temperature data THW from the coolant sensor 9 are fetched by an A/D conversion routine(s) executed at predetermined intervals, and then stored in the RAM 105; i.e., the data Q and THW in the RAM 105 are updated at predetermined intervals. The engine speed Ne is calculated by an interruption routine executed at 30° CA, i.e., at every pulse signal of the crank angle sensor 6, and is stored in the RAM 105.

The operation of the control circuit 10 of FIG. 2 is now explained.

Figure 3A:
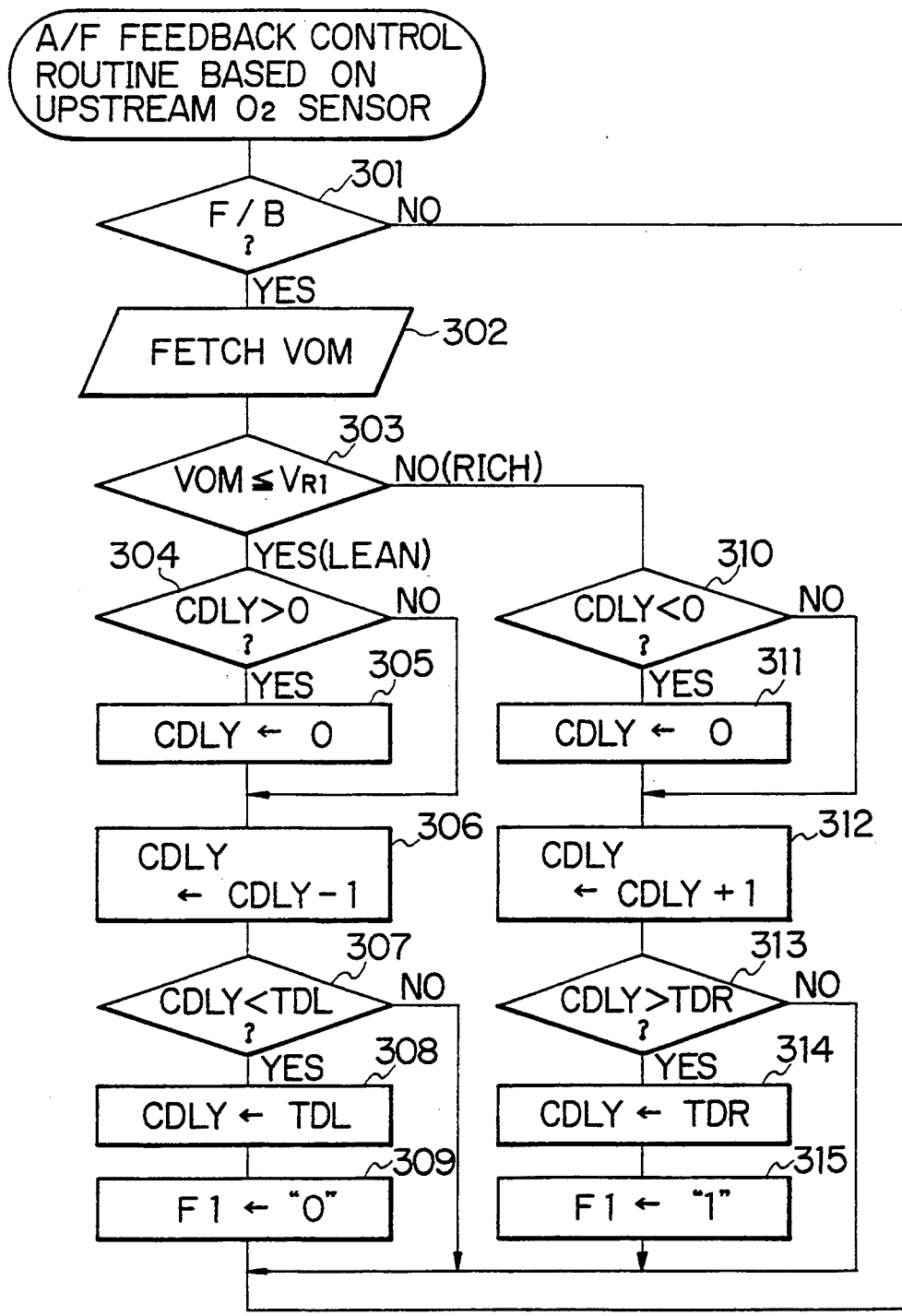
FIGS. 3A, 3B, 5A, 5B, and 6 are flow charts showing the operation of the control circuit in FIG. 2.
Figure 3:
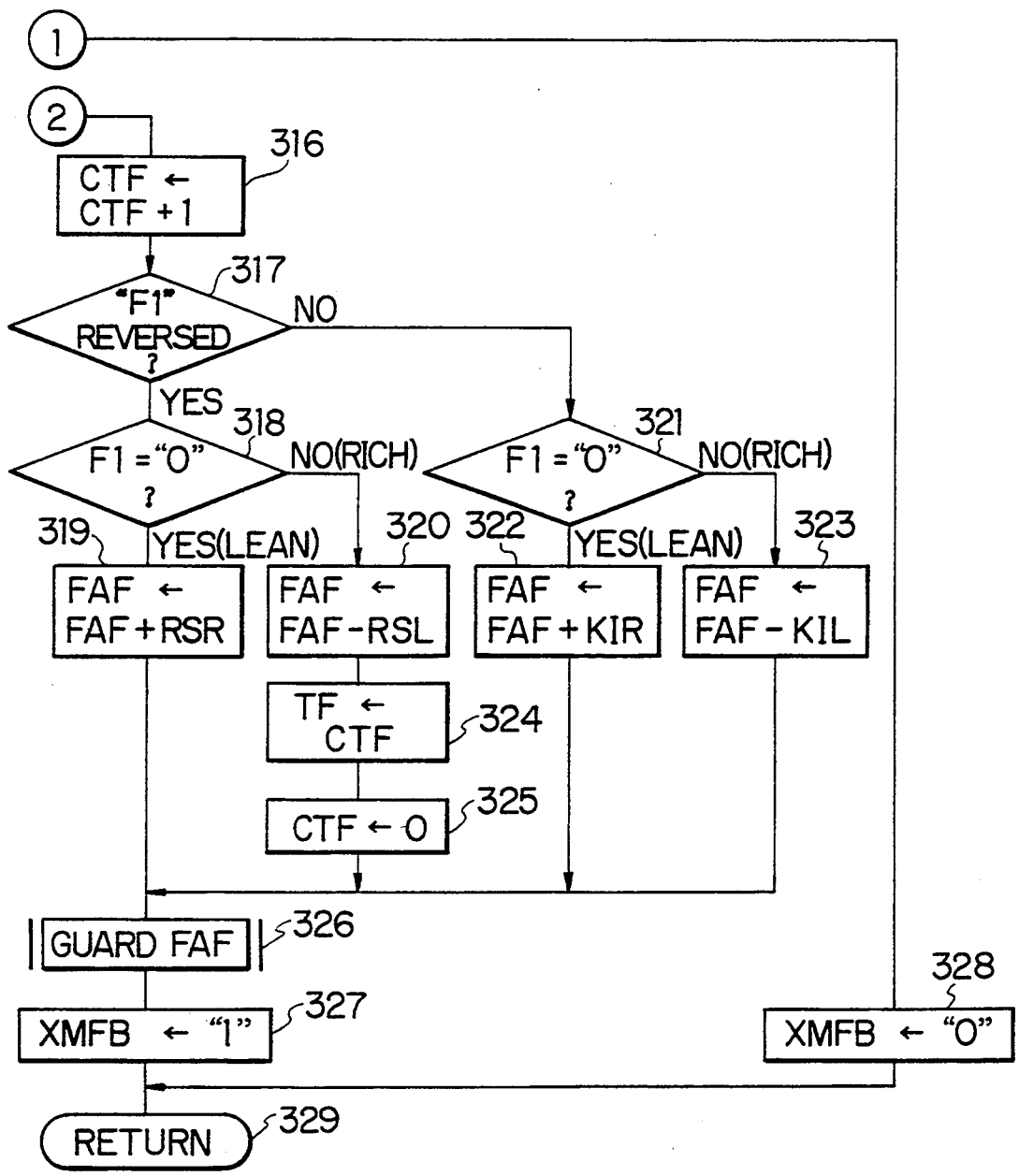

FIGS. 3A and 3B show a routine for a feedback control of the air-fuel ratio. This routine calculates an air-fuel ratio correction factor FAF in accordance with the output VOM of the upstream $O_2$ sensor 13, and is executed at predetermined intervals of, e.g., 4 ms.

At step 301 in FIG. 3A, it is determined whether or not all conditions for air-fuel ratio feedback control are satisfied. The conditions for a feedback control are, for example, the engine is not being started,
the coolant temperature is higher than a predetermined value,
the fuel increments, such as a start-up fuel increment, a warming-up fuel increment, a power fuel increment, or an OTP fuel increment for preventing an excess rise in the temperature of the catalytic converters, are not being carried out,
the outputs of the upstream $O_2$ sensor 13 have been reversed (i.e., changed from a rich air-fuel ratio output signal to a lean air-fuel ratio output signal or vice versa) at least once,
a fuel cut operation is not being carried out.

If any one of these conditions is not satisfied, the routine proceeds to step 328 in FIG. 3B, which causes an air-fuel ratio feedback control flag XMFB to be "0" and the routine terminates at step 329 in FIG. 3B.

If all of the conditions for the air-fuel ratio feedback control are satisfied at step 301, the routine proceeds to step 302.

At step 302, an A/D conversion is performed upon receiving the output voltage VOM of the upstream $O_2$ sensor 13, and the A/D converted value thereof is then fetched from the A/D converter 101. Then, at step 303, the voltage VOM is compared with a reference voltage $V_{R1}$ to thereby determine whether the current air-fuel ratio detected by the upstream $O_2$ sensor 13 is on the rich side or on the lean side with respect to the stoichiometric air-fuel ratio. The reference voltage $V_{R1}$ is usually set at or near the central value of the maximum amplitude of the output of the $O_2$ sensor and, in this embodiment, $V_{R1}$ is set at 0.45 V.

If $VOM \leq V_{R1}$, which means that the current air-fuel ratio is lean, the control proceeds to step 304, at which it is determined whether the value of a delay counter CDLY is positive. If CDLY > 0, the control proceeds to step 305, which clears the delay counter CDLY, and then proceeds to step 306. At step 306, the delay counter CDLY is counted down by 1, and at step 307, it is determined whether or not CDLY < TDL. Note that TDL is a lean delay time for which a rich state is maintained even after the output of the upstream $O_2$ sensor 13 is changed from the rich side to the lean side, and is defined by a negative value. Therefore, at step 307, only when CDLY < TDL does the control proceed to step 308, which causes CDLY to be TDL, and then to step 309, which causes an air-fuel ratio flag F1 to be "0" (lean state). On the other hand, if $VOM > V_{R1}$, which means current air-fuel ratio is rich, the control proceeds to step 310, which determines whether or not the value of the delay counter CDLY is negative. If CDLY < 0, the control proceeds to step 311, which clears the delay counter CDLY, and then proceeds to step 312. If CDLY $\geq$ 0, the control directly proceeds to step 312. At step 312, the delay counter CDLY is counted up by 1, and at step 313, it is determined whether or not CDLY > TDR. Note that TDR is a rich delay time for which a lean state is maintained even after the output of the upstream $O_2$ sensor 13 is changed from the lean side to the rich side, and is defined by a positive value. Therefore, at step 313, only when CDLY > TDR does the control proceed to step 314, which causes CDLY to be TDR, and then proceeds to step 315, which causes an air-fuel ratio flag F1 to be "1" (rich state).

Then at step 316, a counter CTF is counted up by 1. As explained later, the counter CTF is used for measuring the period TF of the cycle of the air-fuel ratio feedback control, and counted up by 1 at every execution of the routine.

Next, at step 317 in FIG. 3B, it is determined whether the air-fuel ratio flag F1 is reversed, i.e., whether the delayed air-fuel ratio detected by the upstream $O_2$ sensor 13 is reversed. If the air-fuel ratio flag F1 is reversed, the control proceeds to steps 318 to 320, and a skip operation is carried out. That is, the flag F1 is "0" (lean) at step 318, the control proceeds to step 319, which increases the correction factor FAF by a skip amount RSR.

If the flag F1 is "1" (rich) at step 318, the control proceeds to step 320, which reduces the correction factor FAF by a skip amount RSL. In this case, also steps 324 and 325 are executed, which stores the value of the counter CTF in the RAM 105 as the value TF at step 324, and clears the counter CTF at step 325. Thereby, the value corresponding to the time lapsed from the time when the flag F1 was last reversed from "0" to "1" to the time when the flag F1 was reversed from "0" to "1" this time, i.e., the value of the period of the cycle of the air-fuel ratio feedback control is always updated and stored in the RAM 105 as TF.

If the air-fuel ratio flag F1 is not reversed at step 317, the control proceeds to steps 321 to 323, which carry out an integration operation. That is, if the flag F1 is "0" (lean) at step 321, the control proceeds to step 322, which gradually increases the correction factor FAF by a rich integration amount KIR. Also, if the flag F1 is "1" (rich) at step 321, the control proceeds to step 323, which gradually decreases the correction factor FAF by a lean integration amount KIL.

Then, at step 326, the air-fuel ratio correction factor FAF is guarded, for example, by a minimum value of 0.8 and by a maximum value of 1.2, thereby preventing the controlled air-fuel ratio from becoming overrich or overlean.

The correction factor FAF is then Stored in the RAM 105 and the control proceeds to step 327, which causes the air fuel ratio feedback control flag XMFB to be "1", and the routine then terminates at step 326.

Figures 4A, 4B, 4C, 4D:
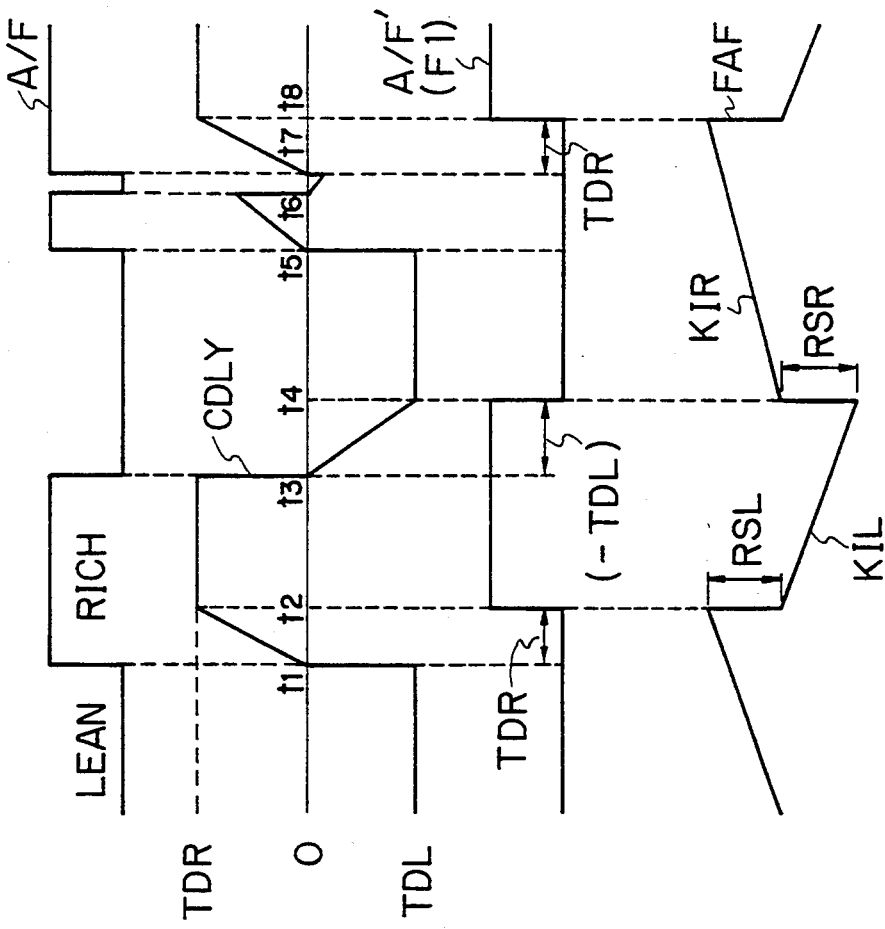
FIGS. 4A, 4B, 4C and 4D are timing diagrams explaining the flow chart of FIGS. 3A and 3B.

The control operation by the flowcharts of FIGS. 3A and 3B are further explained with reference to FIGS. 4, A through D. As illustrated in FIG. 4A, when the air-fuel ratio signal A/F is obtained by the output of the upstream $O_2$ sensor 13, the delay counter CDLY is counted up when in a rich state, and is counted down when in a lean state, as illustrated in FIG. 4B. As a result, a delayed air-fuel ratio corresponding to the air-fuel ratio flag F1 is obtained as illustrated in FIG. 4C. For example, at time $t_1$, even when the air-fuel ratio A/F is changed from the lean side to the rich side, the delayed air-fuel ratio A/F' (F1) is changed at time $t_2$ after the rich delay time TDR. Similarly, at time $t_3$, even when the air-fuel ratio A/F is changed from the rich side to the lean side, the delayed air-fuel ratio A/F' (F1) is changed at time $t_4$ after the lean delay time TDL. At time $t_5$, $t_6$, or $t_7$, however, when the air-fuel ratio A/F is reversed in a shorter time than the rich delay time TDR or the lean delay time TDL, the delayed air-fuel ratio F1 is reversed at time $t_8$. That is, the delayed air-fuel ratio A/F' (F1) is stable when compared with the air-fuel ratio A/F. Further, as illustrated in FIG. 4D, at every change of the delayed air-fuel ratio F1 from the rich side to the lean side, or vice versa, the correction factor FAF is skipped by the skip amount RSR or RSL, and the correction factor FAF is gradually increased or reduced in accordance with the delayed air-fuel ratio F1.

In this embodiment, the above-explained period TF (the period of the cycle of the air-fuel ratio feedback control) is equal to the interval of executions of the RSL skip operation.

Next, the air-fuel ratio feedback control of the double $O_2$ sensor system, in which the air-fuel ratio is controlled based on the output of the downstream $O_2$ sensor 15 as well as the output of the upstream $O_2$ sensor 13, is explained.

Generally, three types of air-fuel ratio feedback control operations by the downstream $O_2$ sensor 15 are used, i.e., the operation type in which one or more of the parameters such as the skip amounts RSR, RSL, integration amounts KIR, KIL and delay times TDR, TDL are variable, and the operation type in which the reference voltage $V_{R1}$ of the outputs VOM of the upstream $O_2$ sensor is variable, or, the operation type in which a second air-fuel ratio correction factor FAF2 calculated in accordance with the output of the downstream $O_2$ sensor 15 is introduced.

For example, if the rich skip amount RSR is increased or if the lean skip amount RSL is decreased, the controlled air-fuel ratio becomes richer, and if the lean skip amount RSL is increased or if the rich skip amount RSR is decreased, the controlled air-fuel ratio becomes leaner. Thus, the air-fuel ratio can be controlled by changing the rich skip amount RSR and the lean skip amount RSL in accordance with the output of the downstream $O_2$ sensor 15. Further, if the rich integration amount KIR is increased or if the lean integration amount KIL is decreased, the controlled air-fuel ratio becomes richer, and if the lean integration amount KIL is increased or if the rich integration amount KIR is decreased, the controlled air-fuel ratio becomes leaner. Thus, the air-fuel ratio can be controlled by changing the rich integration amount KIR and the lean integration amount KIL in accordance with the output of the downstream $O_2$ sensor 15. Further, if the reference voltage $V_{R1}$ is increased, the controlled air-fuel ratio becomes richer, and if the reference voltage $V_{R1}$ is decreased, the controlled air-fuel ratio becomes leaner. Thus, the air-fuel ratio can be controlled by changing the reference voltage $V_{R1}$ in accordance with the output of the downstream $O_2$ sensor 15.

Also, if the rich delay time becomes longer than the lean delay time (i.e., TDR>TDL), the controlled air-fuel ratio becomes richer, and if the lean delay time becomes longer than the rich delay time (i.e., TDL TDR), the controlled air-fuel ratio becomes leaner. Thus, the air-fuel ratio can be controlled by changing the rich delay time TDR and the lean delay time TDL in accordance with the output of the downstream $O_2$ sensor 15.

These types of air-fuel ratio control operations have respective advantages. For example, if the delay times TDR, TDL are variable, a precise control of the air-fuel ratio can be obtained, and if the skip amounts RSR, RSL are variable, the response of the control is improved. Naturally, two or more of these types of operation can be used at the same time.

Figure 5A:
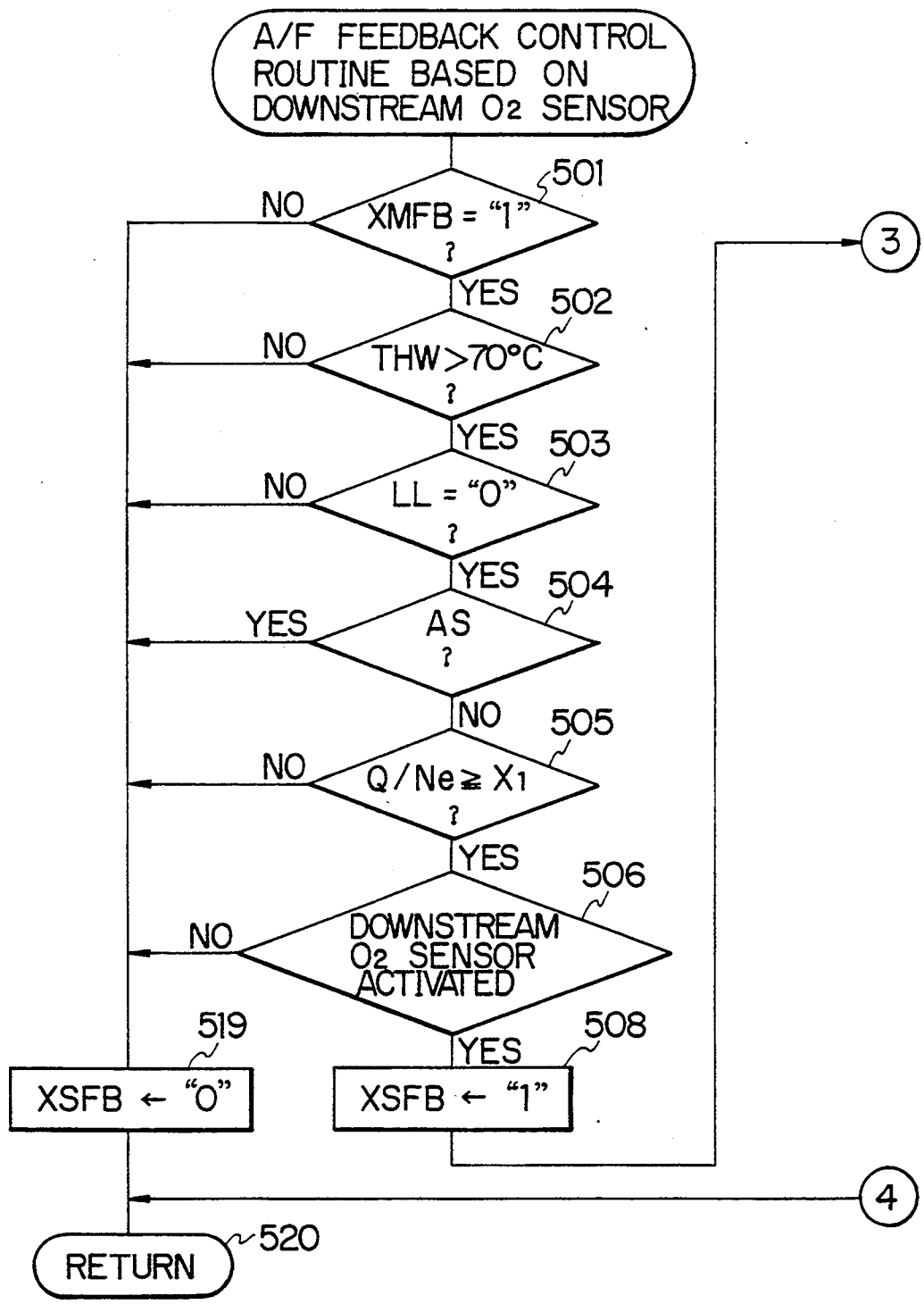
Figure 5B:
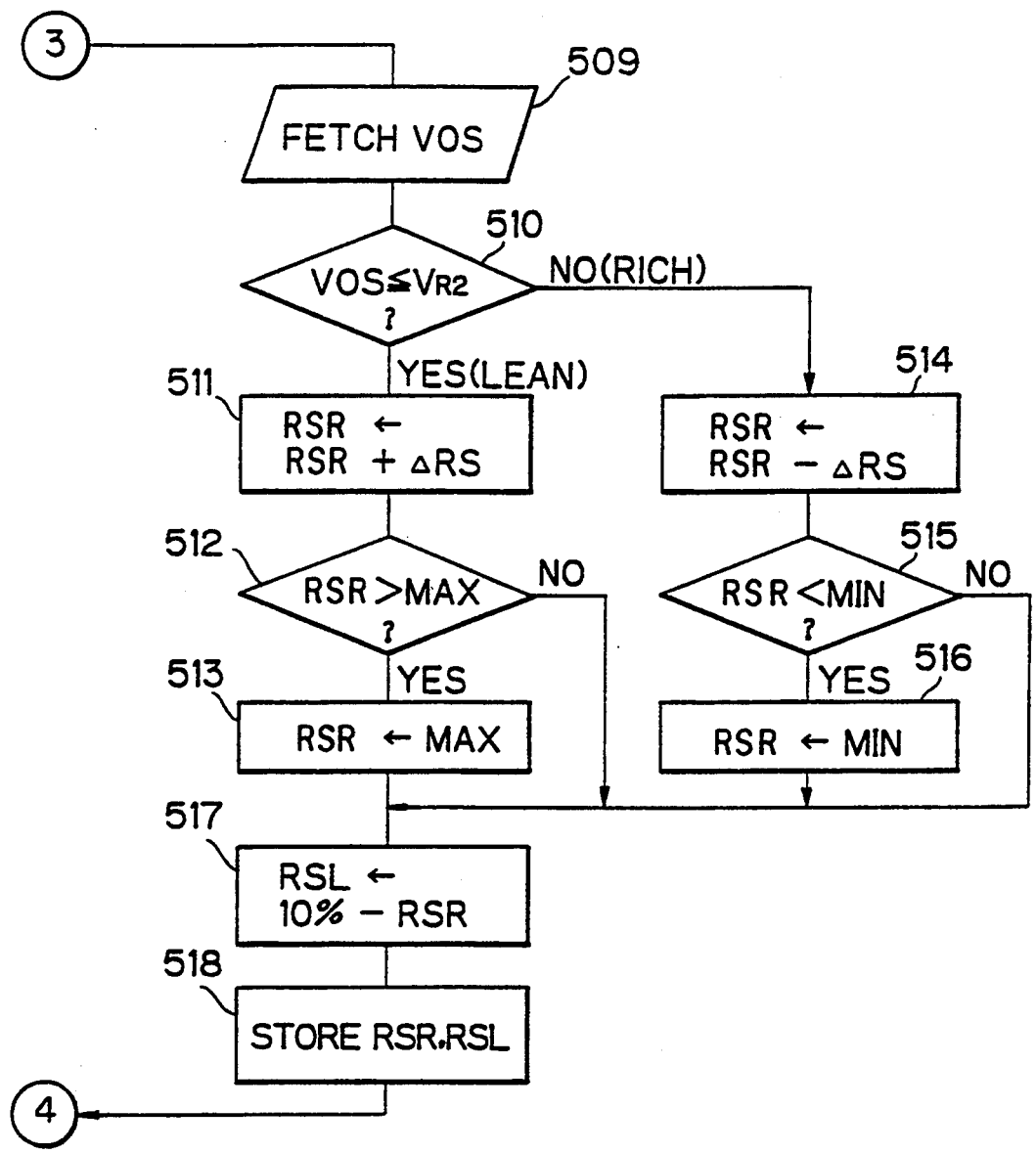

FIGS. 5A and 5B show a flow chart of the control operation of the double $O_2$ sensor system in which the skip amounts RSR, RSL are varied in accordance with the output VOS of the downstream $O_2$ sensor 15. This routine is executed at predetermined intervals of, e.g., 512 ms.

The steps from 501 to 506 of FIG. 5A show the operation for determining whether the conditions for executing the feedback control based on the output of the downstream $O_2$ sensor 15 are satisfied.

These conditions are, the conditions for executing the air-fuel ratio feedback control based on the output of the upstream $O_2$ sensor 13 are satisfied (the air-fuel ratio feedback control flag XMFB="1" at step 501), the temperature THW of the coolant is higher than a predetermined value (e.g., 70° C.), (step 502), the throttle valve 16 is not fully closed (i.e., the signal LL is not ON), (step 503), the secondary air AS is not introduced into the exhaust manifold, (step 504), the load of the engine represented by Q/Ne is more than a predetermined value $X_1$ (i.e., Q/Ne≧$X_1$), (step 505), the downstream $O_2$ sensor 15 is activated (step 506).

If any one of these conditions are not satisfied, the routine proceeds to step 519 in which an air-fuel ratio feedback control flag XFSB is reset (="0").

If all of the conditions of steps 501 to 506 are satisfied, the flag XSFB is set (="1") at step 508, and the routine proceeds to step 509 of FIG. 5B.

The steps 509 through 518 illustrate the operation for calculating the skip amounts RSR or RSL in accordance with the output VOS of the downstream $O_2$ sensor 15.

At step 509, an A/D conversion is performed on the output voltage VOS of the downstream $O_2$ sensor 15, and the A/D converted value thereof is then fetched from the A/D converter 101. Then at step 510, the voltage VOS is compared with a reference voltage $V_{R2}$ such as 0.55 v, to determine whether the current air-fuel ratio detected by the downstream $O_2$ sensor 15 is on the rich side or on the lean side with respect to the stoichiometric air-fuel ratio. Note that the reference voltage $V_{R2}$ (=0.55 V) is preferably higher than the reference voltage $V_{R1}$ (=0.45 V), in consideration of the difference in output characteristics and deterioration speed between the $O_2$ sensor 13 upstream of the catalytic converter and the $O_2$ sensor 15 downstream of the catalytic converter.

If VOS≦$V_{R2}$ (lean state) at step 510, then the routine proceeds to steps 511 to 513, and if VOS>$V_{R2}$ (rich state), the routine proceeds to steps 514 to 516. Namely, at step 511, the rich skip amount RSR is increased by ΔRS (constant value), thereby shifting the air-fuel ratio to the rich side. Then, at steps 512 and 513, the rich skip amount RSR is guarded by a maximum value MAX (e.g., approximately 7.5%). On the other hand, at step 514, the rich skip amount is decreased by ΔRS, thereby shifting the air-fuel ratio to the lean side. Then, at steps 515 and 516, the rich skip amount RSR is guarded by a minimum value MIN (e.g., approximately 2.5%). The maximum value MAX is selected so that the amount of change of the air-fuel ratio is maintained within a range that does not deteriorate driveability, and the minimum value MIN is selected so that the response of the control in a transient condition is not lowered.

At step 517, the lean skip amount RSL is calculated by $$RSL \leftarrow 10\% - RSR.$$

Namely, a sum of RSR and RSL is maintained at 10. Then at step 518, the skip amounts RSR and RSL are stored in the backup RAM 106, and the routine terminates at step 520 in FIG. 5A.

Figure 6:
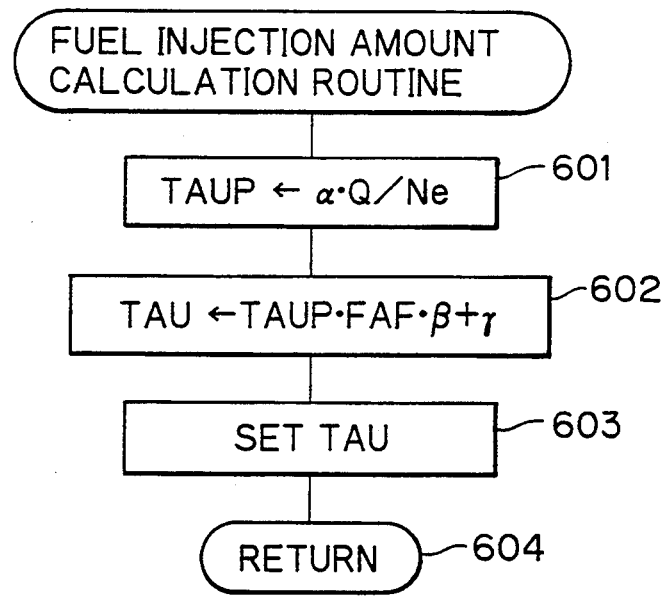

FIG. 6 shows a routine for calculating the fuel injection amount using the air-fuel ratio correction factor FAF calculated by the routine of FIGS. 3A and 3B.

At step 601, a basic fuel injection amount TAUP is calculated in accordance with the amount of the inlet air per one revolution of the engine, Q/Ne, by $$TAUP \leftarrow \alpha \cdot Q/Ne$$

where, TAUP is the fuel injection amount required to obtain the stoichiometric air-fuel ratio and $\alpha$ is a predetermined constant.

Then, at step 602, a fuel injection amount TAU is calculated by $$TAU \leftarrow TAUP \cdot FAF \cdot \beta + \gamma$$

where, $\beta$ and $\gamma$ are correction factors determined by operating conditions of the engine. The calculated TAU is set to the down counter 108 and a flip-flop 109 is set at step 603, whereby fuel injection is started.

As stated before, when the time corresponding to TAU has lapsed, the flip-flop 109 is reset by the signal from the down counter 108, whereby the fuel injection is terminated.

Figure 7A:
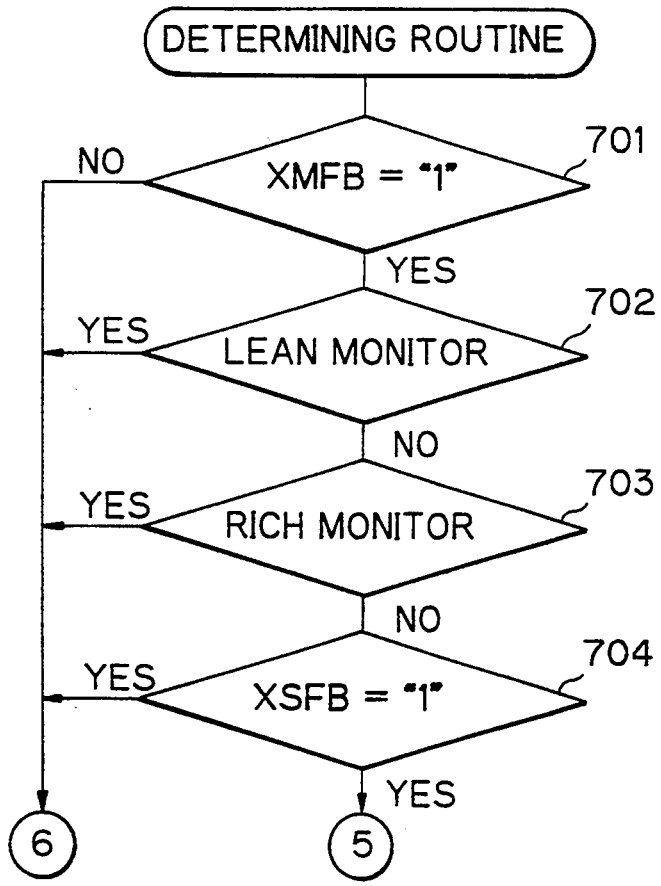
FIGS. 7A and 7B are flow charts showing an embodiment of the determining operation of the catalyst deterioration.
Figure 7B:
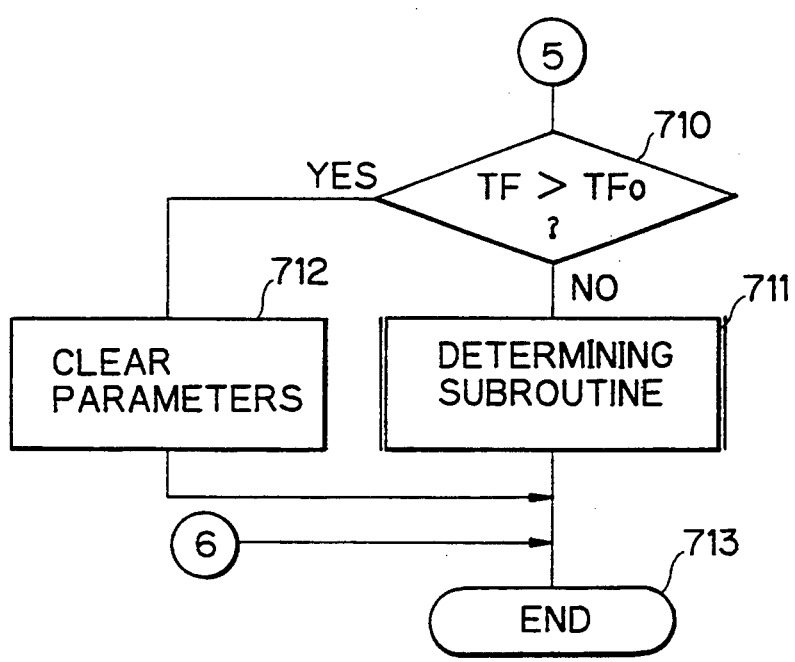

FIGS. 7A and 7B show the routine for determining whether the catalytic converter 12 has deteriorated. This routine is executed by the control circuit 10 at a predetermined intervals such as 4 ms.

When the routine is started, it is determined at step 701 in FIG. 7A, whether the air-fuel ratio feedback control based on the output VOM of the upstream $O_2$ sensor 13 is being carried out, from the value of the flag XMFB. If the feedback control is being carried out (i.e., XMFB="1" at step 701), it is determined whether a lean side condition or a rich side condition of the output VOM of the upstream $O_2$ sensor 13 is being maintained at more than a predetermined time by a lean monitor at step 702 and a rich monitor at step 703. And at step 704, it is determined whether the air-fuel ratio feedback control based on the output VOS of the downstream $O_2$ sensor 15 is being carried out, from the value of the flag XSFB.

The routine proceeds to step 710 in FIG. 7B only when the air-fuel ratio feedback control based on both VOM and VOS is carried out (XMFB="1" at step 701 and XSFB="1" at step 704), and the output VOM of the upstream $O_2$ sensor 13 does not stay at the lean side nor the rich side for more than a predetermined time (step 702 and 703).

At step 710, it is determined whether the execution of the determining operation of the catalyst deterioration is allowed based on the period TF of the cycle of the air-fuel ratio feedback control.

As explained before, errors in the determination of the deterioration of the catalyst may occur when the period TF of the cycle of the air-fuel ratio feedback control becomes longer. Therefore, in this embodiment, the execution of the determining operation of the deterioration of the catalyst is allowed only when said period TF, which is stored in the RAM 105 at step 324 in FIG. 3B, is smaller than a predetermined value $TF_0$. In this embodiment, the value $TF_0$ is set at the value corresponding to approximately 2 seconds, however, it is preferable to determine an appropriate value of $TF_0$ by experiments, since the suitable value of $TF_0$ varies according to the type of the vehicle and the engine, etc.

If the period of the cycle of the air-fuel ratio feedback control is longer than the predetermined time, i.e., if $TF > TF_0$ at step 710, the execution of the determining operation of the catalyst deterioration is prohibited even if all of the conditions of steps 701 through 704 are satisfied. In this case, the routine proceeds to step 712, which clears a counter $CT_1$ and other parameters used for determining operation of the catalyst deterioration (CS, $VOM_{i-1}$, $VOS_{i-1}$, etc.). The routine then terminates at step 713.

If $TF \leq TF_0$ at step 710, the routine then proceeds to step 711, at which a subroutine for determining the deterioration of the catalyst is executed.

In the subroutine of step 711, various methods can be used to determine the deterioration of the catalyst. Hereinafter, three typical methods, i.e., a method using the number of reversals of the output signal of the downstream $O_2$ sensor, a method using the lengths of the output signal response curves both of the $O_2$ sensors, and a method using the lengths and areas of the output signal response curves are explained with reference to FIGS. 8 through 11.

Figure 8:
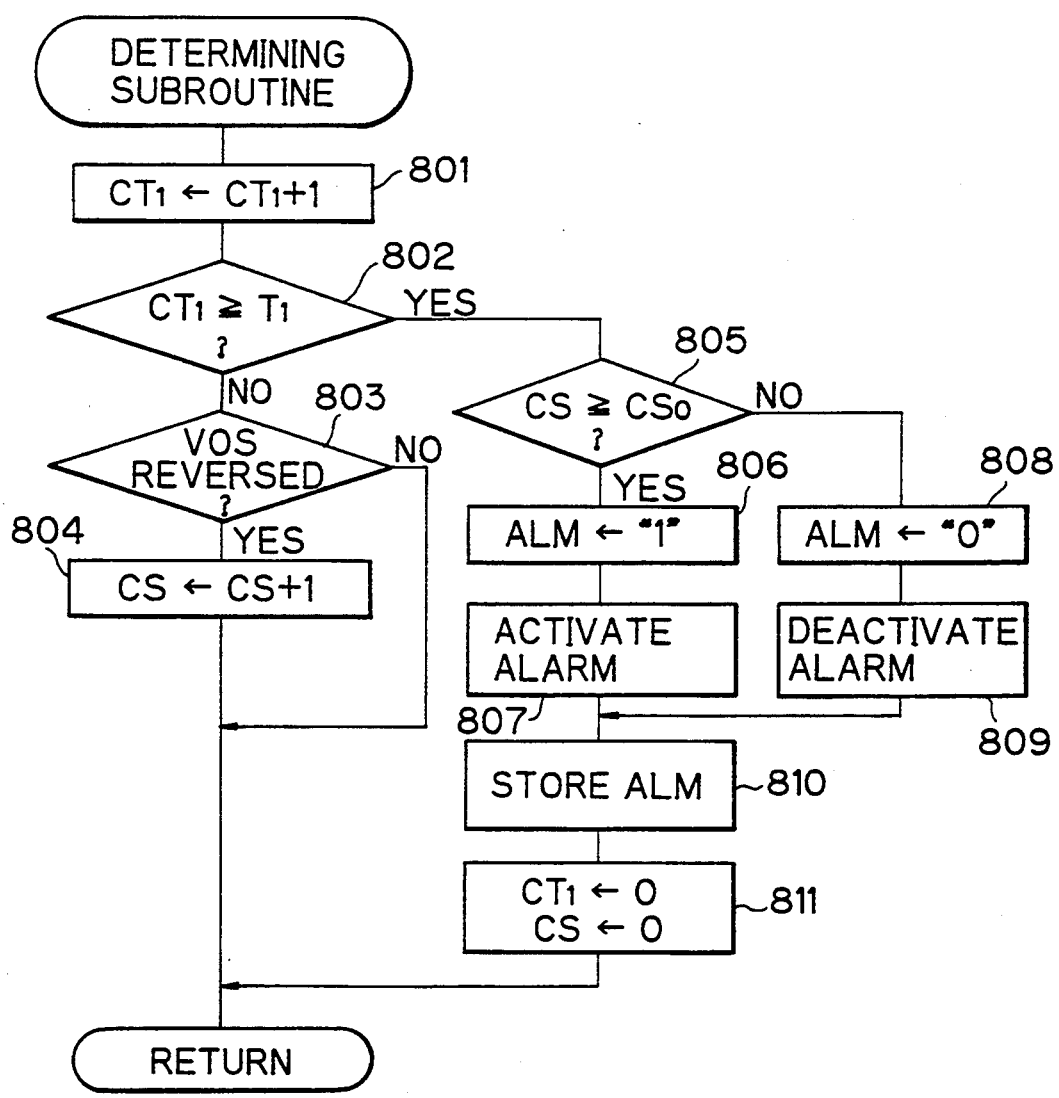
FIG. 8 is a flow chart showing an embodiment of the subroutine for determining the deterioration of the catalyst in FIG. 7B.
Figure 9:
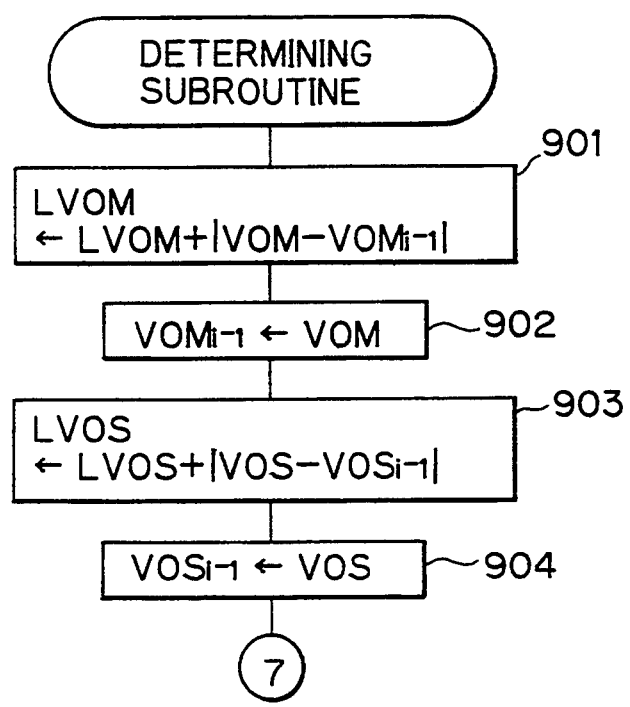
FIGS. 9A and 9B are flow charts showing an embodiment of the subroutine for determining the deterioration of the catalyst in FIG. 7B.
Figure 9:
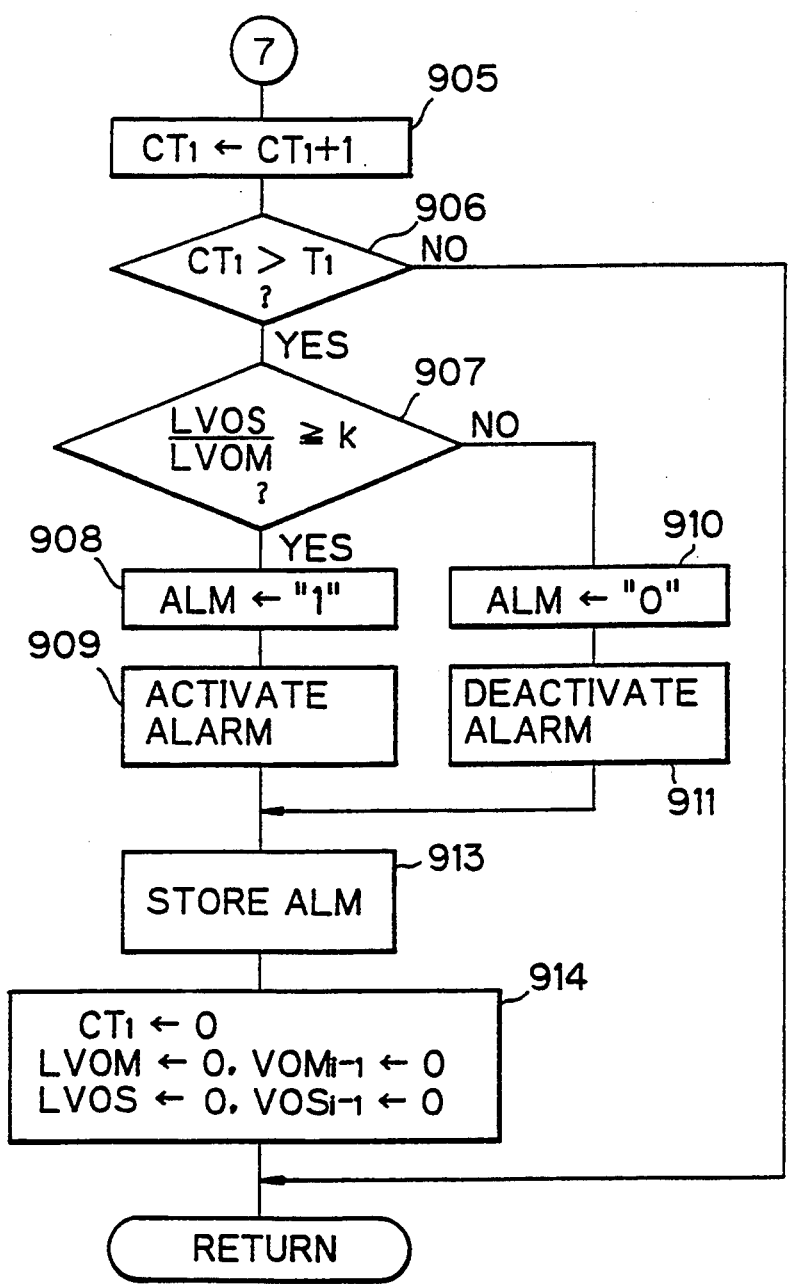
Figure 10:
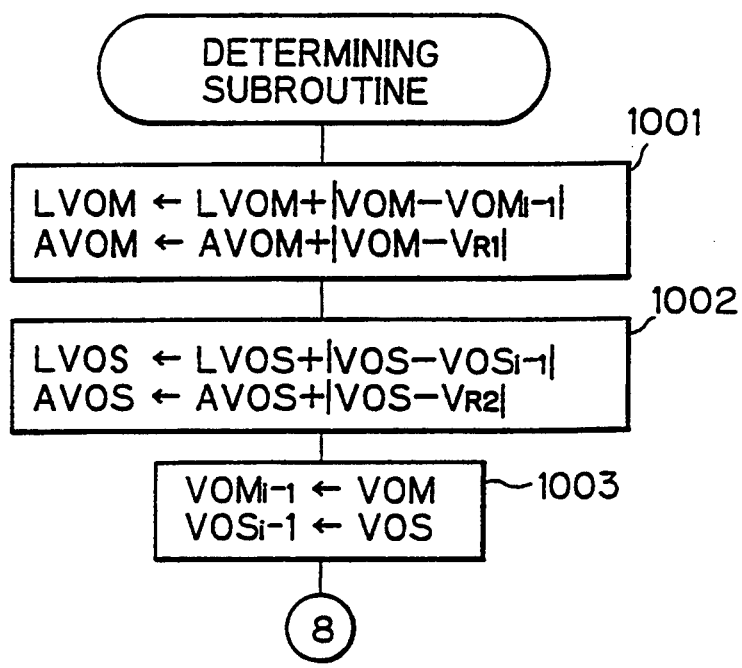
FIGS. 10A and 10B are flow charts showing an embodiment of the subroutine for determining the deterioration of the catalyst in FIG. 7B.
Figure 10:
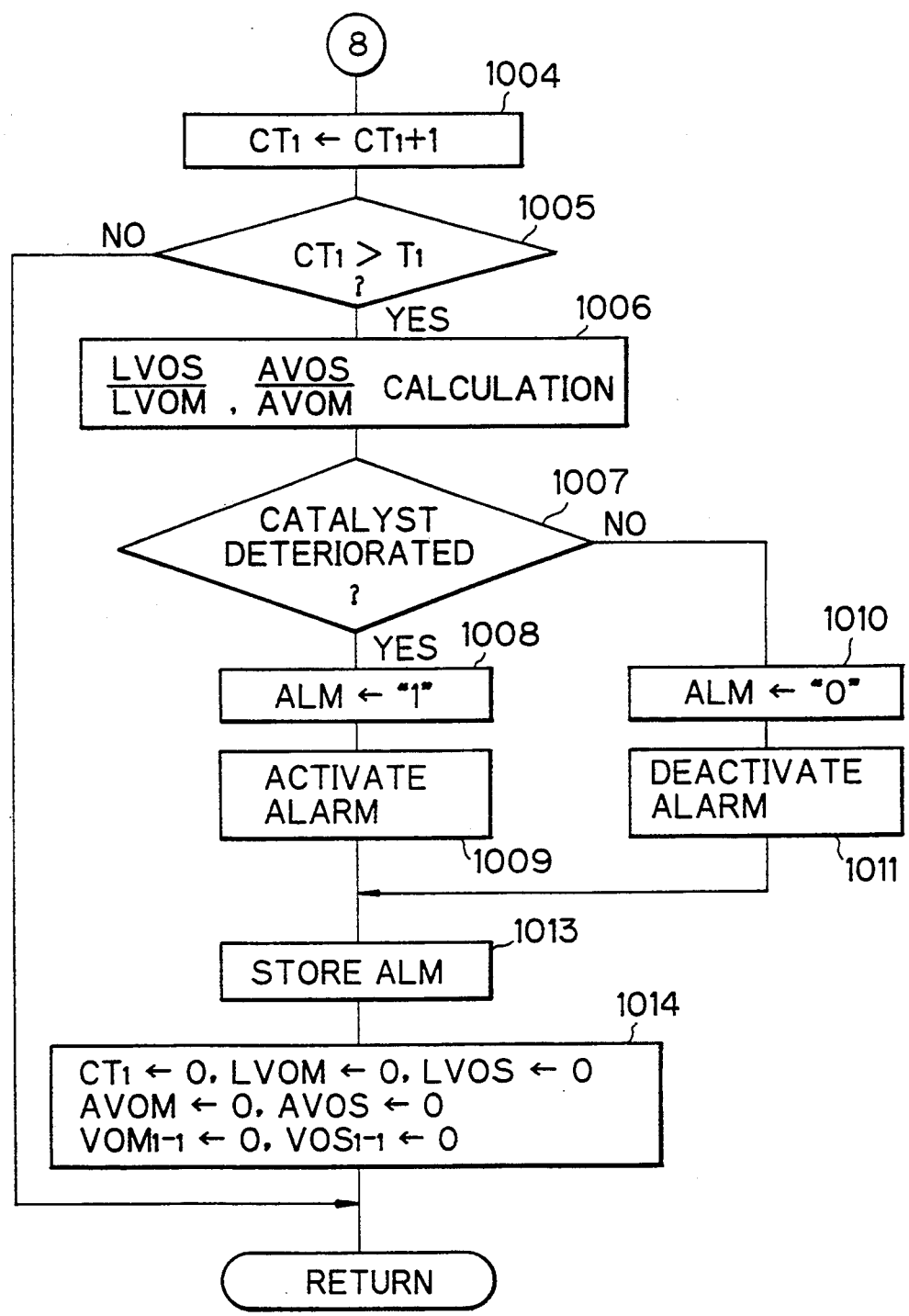

FIG. 8 shows an embodiment of the subroutine for determining the deterioration of the catalyst using the number of reversals of the output signal of the downstream $O_2$ sensor 15.

In FIG. 8, when the subroutine starts, a counter $CT_1$ is counted up by 1 at step 801. Then, at step 802, it is determined whether or not the value of the counter $CT_1$ after count up is larger than $T_1$, where $T_1$ is the value corresponding to a predetermined time period for the execution of the determining operation.

If $CT_1 < T_1$ at step 802 (i.e., the time period $T_1$ has not yet lapsed), the routine proceeds to step 803, which determines whether the output VOS of the downstream $O_2$ sensor 15 has reversed (i.e., changed from the rich air-fuel ratio state signal ($VOS \geq V_{R2}$) to the lean air-fuel ratio state signal ($VOS < V_{R2}$), or vice-versa.) compared with the value of VOS when the subroutine was last executed, and if the output VOS has reversed, a counter CS is counted up by 1 at step 804. Where, the counter CS represents the number of reversals of the output VOS during a predetermined time period $T_1$.

If the time period $T_1$ has lapsed (i.e., $CT_1 \geq T_1$ at step 802), the routine proceeds to step 805, which determines whether the catalyst has deteriorated by comparing the value of the counter CS with a predetermined value $CS_0$.

Figure 1A:
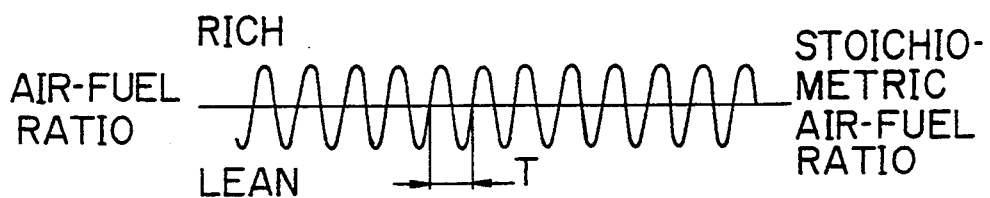
FIGS. 1A through 1H are drawings explaining typical changes in output response curves of the upstream and downstream O₂ sensor caused by the deterioration of the catalyst.
Figure 1B:
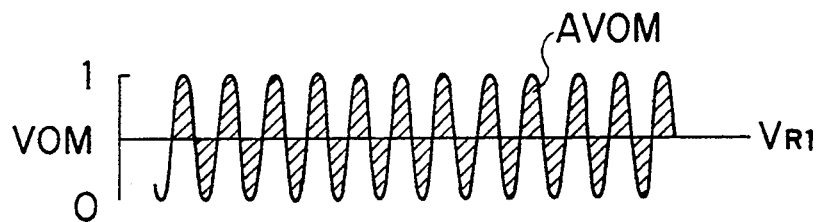
Figure 1C:
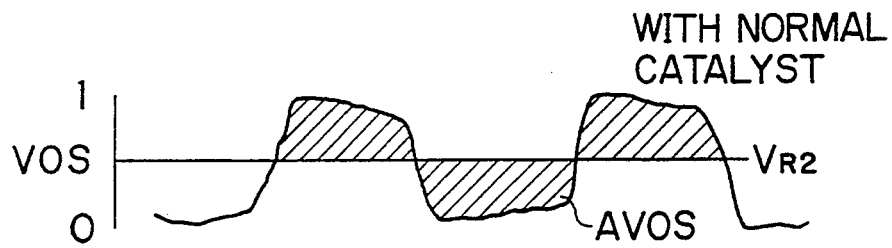
Figure 1D:
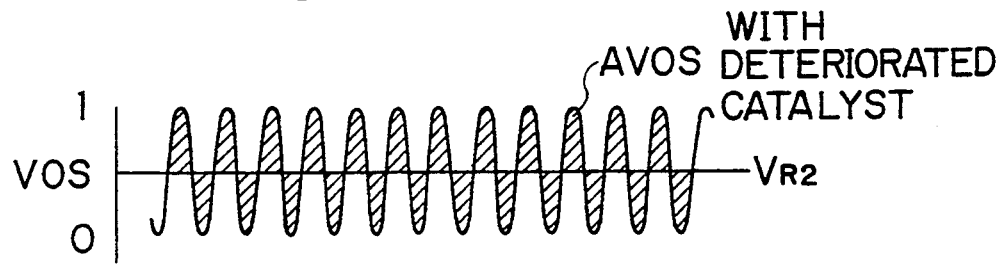
Figure 1E:
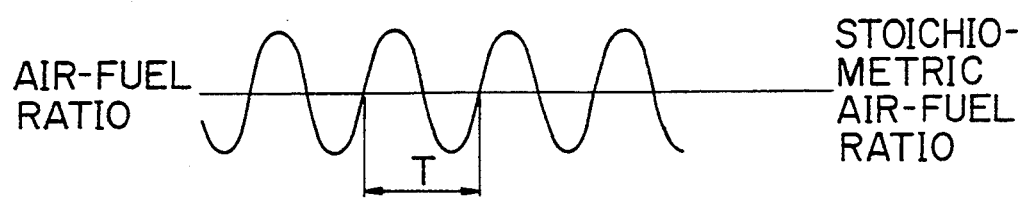
Figure 1F:
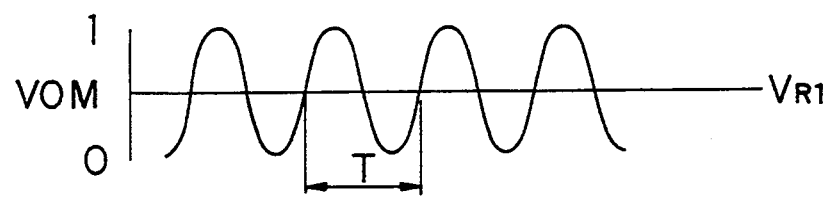
Figure 1G:
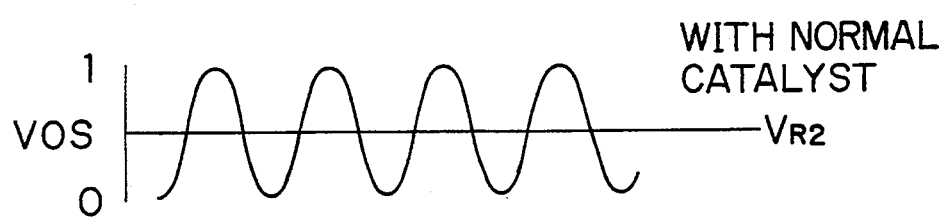
Figure 1H:
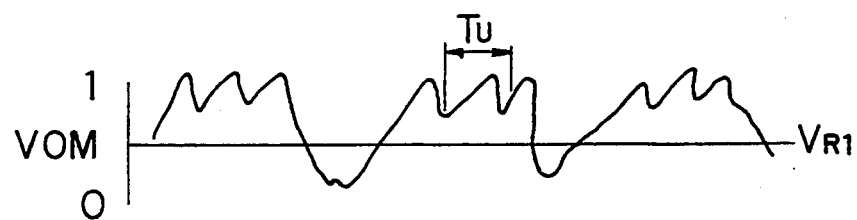

If $CS \geq CS_0$, which means the number of reversals of the output signal VOS of the downstream $O_2$ sensor over the predetermined time period $T_1$ is larger than a predetermined value, it can be considered that the condition of the output VOS is similar to the condition as shown in FIG. 1D (i.e., the catalyst has deteriorated). The routine then proceeds to step 806, which sets (="1") an alarm flag ALM, and to step 807, which activates the alarm 19, thereby warning the driver of catalyst deterioration.

If $CS < CS_0$ at step 805, it can be considered that the output VOS is in a similar condition as in FIG. 1C (i.e., the catalyst is not deteriorated). The routine then proceeds to steps 808 and 809, which resets (="0") the alarm flag ALM, and deactivates the alarm 19.

After executing the above steps, the alarm flag ALM is stored in the backup RAM 106 at step 810, and the counters $CT_1$ and CS are cleared at step 811. The subroutine is then terminated.

In the above subroutine, also the number of reversals of the output signal of the upstream $O_2$ sensor can be used in addition to the number of reversals of the output signal of the downstream $O_2$ sensor. In this case, the number of reversals of the output signal VOM of the upstream $O_2$ sensor is counted by another counter CM, and the catalyst is determined as being deteriorated if a ratio CS/CM is larger than a predetermined value.

FIGS. 9A and 9B show an embodiment of a subroutine for determining the deterioration of the catalyst based on the lengths of the output signal response curves of the upstream $O_2$ sensor 13 and the downstream $O_2$ sensor 15.

As illustrated in FIGS. 1C and 1D, if the air-fuel ratio is feedback controlled at a relatively short period of the control cycle, the amplitude of the oscillation of the output response curve of the downstream $O_2$ sensor 15 becomes larger and the period of the cycle of the oscillation becomes shorter when the catalyst has deteriorated, which causes the length of the output signal curve of the downstream $O_2$ sensor 15 to become larger (FIG. 1D) when the catalyst has deteriorated, compared to the same when the catalyst is normal (FIG. 1C). Therefore, the deterioration of the catalyst can be determined by monitoring the length of the output signal response curve of the downstream $O_2$ sensor 15.

In this embodiment, the lengths of the output response signal curves LVOS and LVOM of the downstream $O_2$ sensor 15 and the upstream $O_2$ sensor 13, respectively, are calculated, and the catalyst is determined as being deteriorated when the ratio (LVOS/LVOM) becomes larger than a predetermined value°

Figure 12:
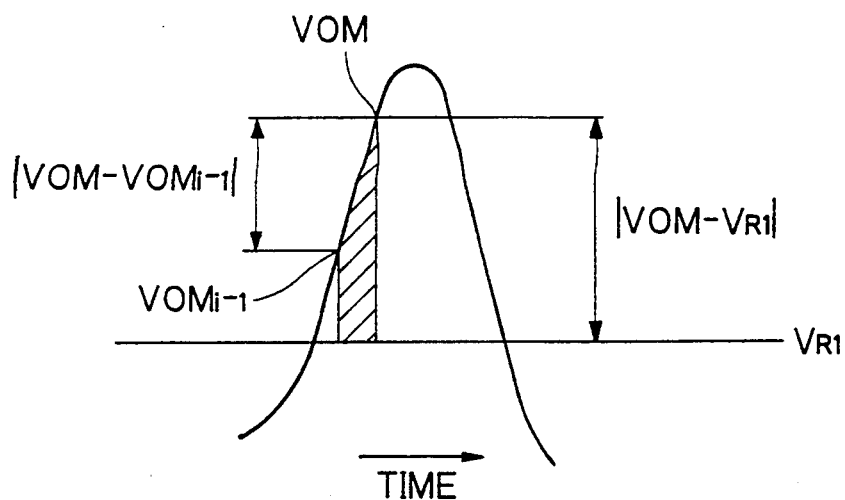
FIG. 12 is a diagram explaining the length and the area of the output signal response curve of the O₂ sensor.

In FIG. 9A, when the subroutine is started, at step 901, the length LVOM of the output signal response curve of the output VOM of the upstream $O_2$ sensor is calculated approximately by $$LVOM \leftarrow LVOM + |VOM - VOM_{i-1}|$$

where, $VOM_{i-1}$ is the value of the output VOM when the routine was last executed (see FIG. 12). The routine then proceeds to step 902 at which the value of $VOM_{i-1}$ is updated to prepare for the next execution of the routine.

At steps 903 and 904, the calculation of the length LVOS of the output signal response curve of the output VOS of the downstream $O_2$ sensor and the updating of the value of $VOS_{i-1}$ are carried out.

The routine then proceeds to steps 905 in FIG. 9B, which counts up the counter $CT_1$ by 1, and 906, which determines from the value of $CT_1$ whether the predetermined time period $T_1$ for executing the determining operation has lapsed. If the time period $T_1$ has lapsed (i.e., $CT_1 > T_1$ at step 906), it is determined whether or not the ratio LVOS/LVOM is larger than a predetermined value K at step 907.

If the ratio LVOS/LVOM is larger than or equal to the value K, it is determined that the catalyst has deteriorated, and the routine proceeds to steps 908, which sets (="1") the alarm flag ALM, and 909, which activates the alarm 19.

If the ratio LVOS/LVOM is smaller than the value K, then the flag ALM is reset (="0") at step 910, and the alarm 19 is deactivated at step 911.

After completing the above steps, the value of the alarm flag ALM is stored in the backup RAM 106 (step 913), and the parameters used for the determining operation are cleared (step 914).

In this embodiment, though both lengths LVOM and LVOS are used for determining the deterioration of the catalyst, the determination of the catalyst deterioration may be carried out using only the length LVOS of the response curve of the output VOS of the downstream $O_2$ sensor 15.

FIGS. 10A and 10B show an embodiment of the subroutine for determining the deterioration of the catalyst based on the lengths and areas of the output response curves of the downstream $O_2$ sensor 15 and the upstream $O_2$ sensor 13.

In this embodiment, the areas (AVOS and AVOM) surrounded by the response curves of the output (VOS and VOM) of the upstream and the downstream $O_2$ sensors and the reference voltage line ($V_{R2}$ and $V_{R1}$) thereof are used as well as the lengths LVOS and LVOM of the output signal response curves to increase the accuracy of the determination.

As illustrated in FIG. 1C, when the catalyst is not deteriorated, the area AVOS surrounded by the output response curve of the downstream $O_2$ sensor and the reference voltage line $V_{R2}$ is relatively large although the length LVOS of the output signal response curve is relatively small. On the other hand, as illustrated in FIG. 1D, the area AVOS becomes relatively small although the length LVOS becomes relatively large when the catalyst has deteriorated. Therefore, the deterioration of the catalyst can be determined more accurately by monitoring the area AVOS as well as the length LVOS of the downstream $O_2$ sensor. Such a method for determining the catalyst deterioration based on the lengths and the areas of the $O_2$ sensors is disclosed in the co-pending U.S. application Ser. No. 957,041 in detail and the disclosure thereof is incorporated into the present specification by reference thereto.

Figure 11A:
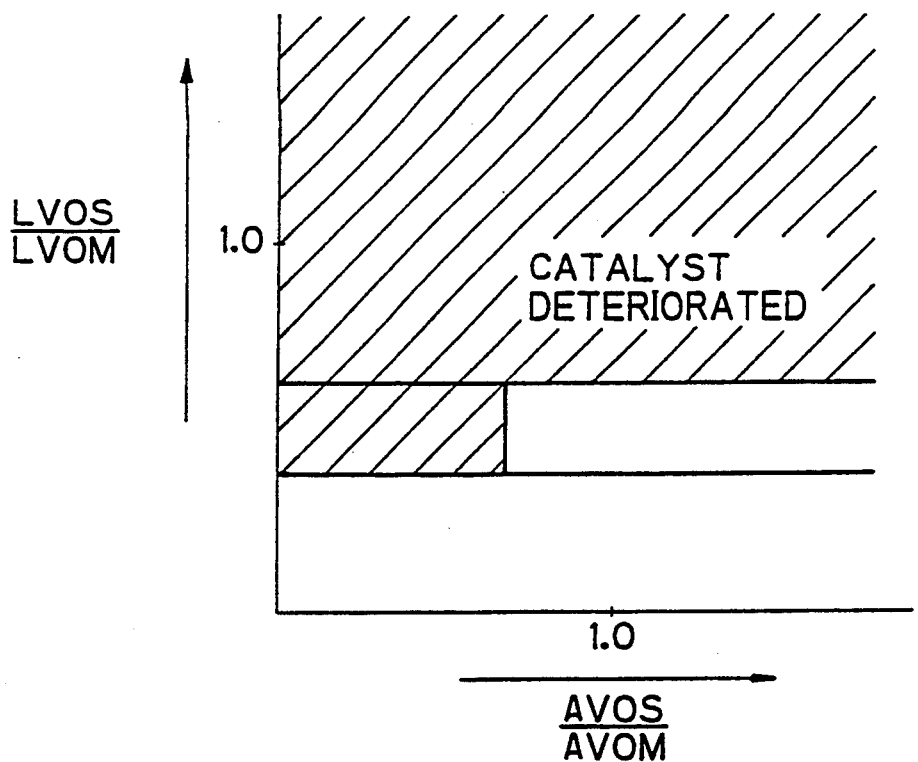
FIGS. 11A through 11C are the examples of the map used for the determination of the deterioration of the catalyst in the embodiment of FIGS. 10A and 10B.
Figure 11B:
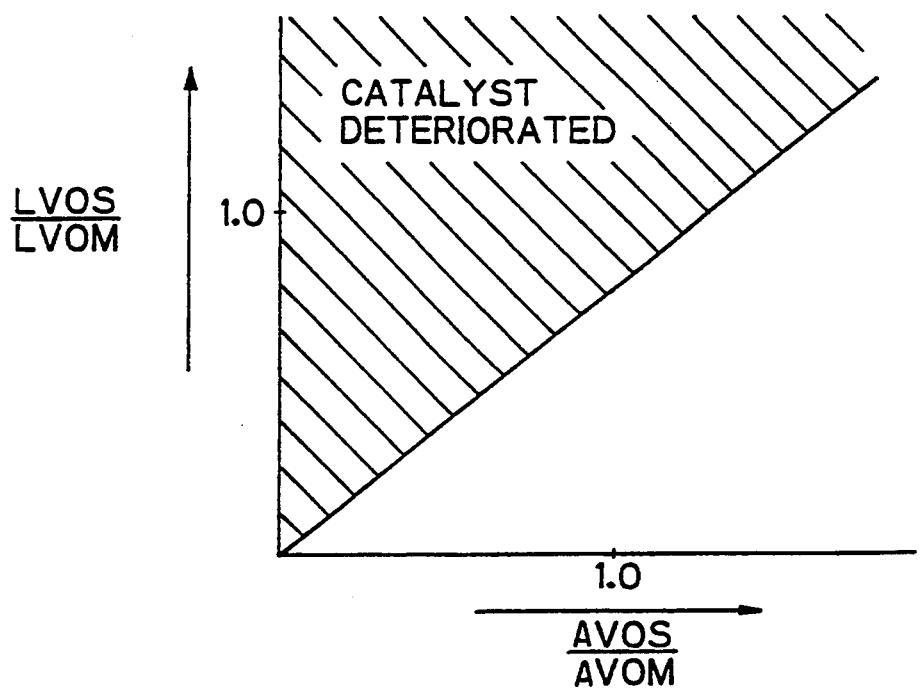
Figure 11C:
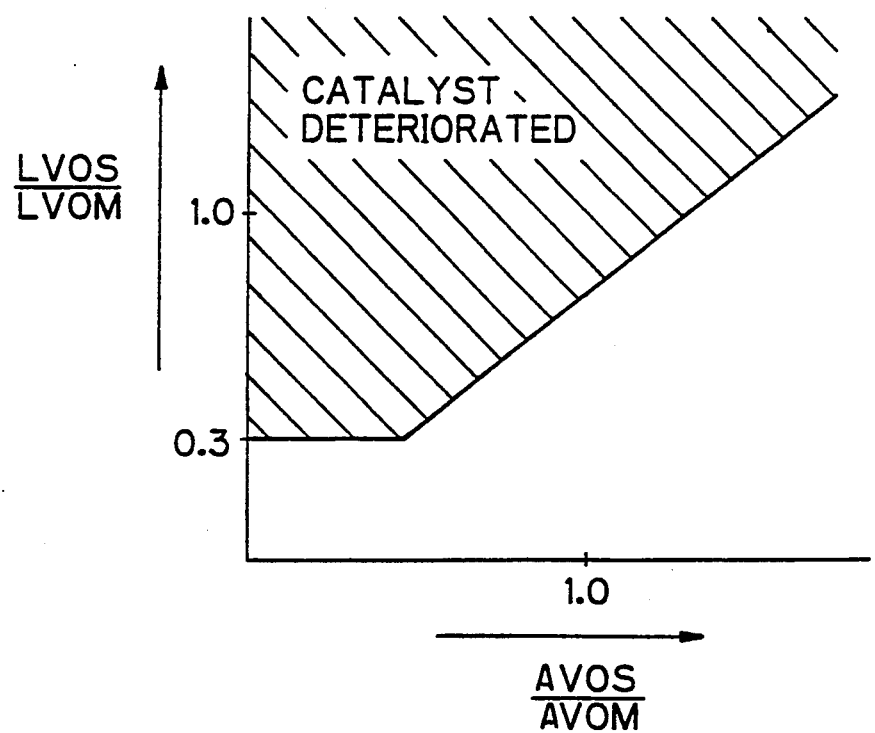

In this embodiment, the lengths LVOS, LVOM and the areas AVOS, AVOM of the output response signal curves VOS, and VOM of the downstream $O_2$ sensor 15 and the upstream $O_2$ sensor 13, respectively, are calculated, and the catalyst deterioration is determined based on the ratios (LVOS/LVOM) and (AVOS/AVOM) using one of the maps illustrated in FIGS. 11A through 11C.

In FIG. 10A, when the subroutine starts, the length LVOM and the area AVOM of the output response curve VOM of the upstream $O_2$ sensor 13 are calculated at step 1001, and the length LVOS and the area AVOS of the output response curve of the downstream $O_2$ 15 sensor are calculated at step 1002. The lengths LVOM and LVOS are calculated by the same formula as in steps 901 and 902 in FIG. 9A. The areas AVOM and AVOS are calculated approximately by, $$AVOM \leftarrow AVOM + |VOM - V_{R1}|$$

$$AVOS \leftarrow AVOS + |VOS - V_{R2}|$$

where, $V_{R1}$ and $V_{R2}$ are the reference voltages of the upstream $O_2$ sensor 13 and the downstream $O_2$ sensor 15 respectively. Then, after the values of $VOM_{i-1}$ and $VOS_{i-1}$ are updated at step 1003, the routine proceeds to step 1004 in FIG. 10B.

At step 1004, the counter $CT_1$ is counted up by 1, and at step 1005, it is determined from the value of $CT_1$ whether the predetermined time period $T_1$ for the execution of the determining operation has lapsed. If the time period $T_1$ has lapsed (i.e., $CT_1 > T_1$ at step 1005), a ratio of the lenth (LVOS/LVOM) and a ratio of the areas (AVOS/AVOM) are calculated at step 1007, and the deterioration of the catalyst is determined by any one of the maps in FIGS. 11A through 11C.

After the determination of catalyst deterioration is carried out at step 1007, the alarm flag ALM is set or reset, and the alarm 19 is activated or deactivated at steps 1008 to 1011 in accordance with the result of the above determination. The value of the alarm flag ALM is then stored in the backup RAM 106 (step 1013), and the parameters are cleared (step 1014).

In the above embodiment, operating conditions that cause errors in the determination of catalyst deterioration are detected by monitoring the period of the cycle of the air-fuel ratio feedback control (FIG. 7B, step 710). However, the detection of such operating conditions can be carried out by monitoring other parameters representing the engine operating condition.

Figure 13:
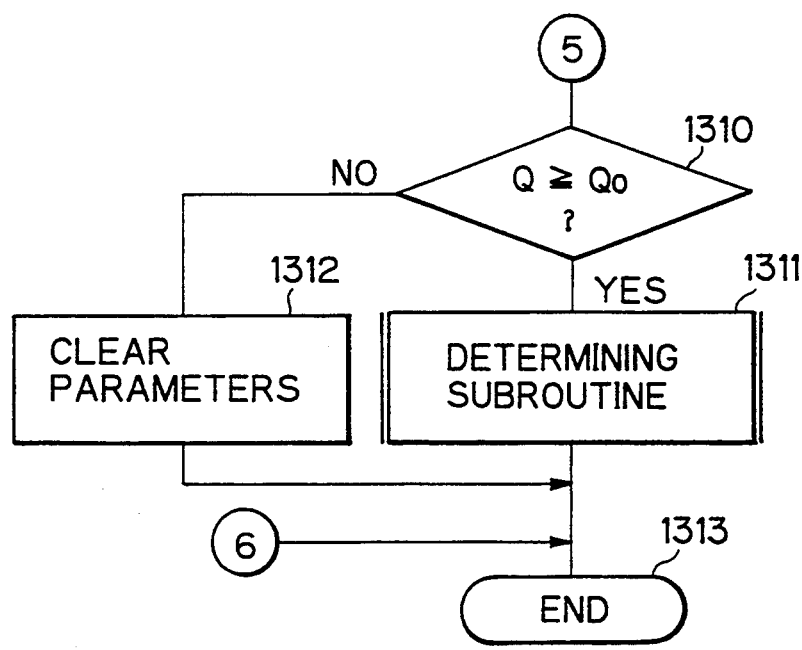
FIG. 13 is a flow chart showing another embodiment of the operation for determining the catalyst deterioration in FIG. 7B.

FIG. 13 is a flow chart that can be used in lieu of FIG. 7B, showing an embodiment in which the amount of the inlet air flow of the engine is used for detecting such operating conditions.

As explained before, when the velocity of the exhaust gas flow in the exhaust passage is low, the period of the cycle of the air-fuel ratio feedback control becomes longer, and since the velocity of the exhaust gas flow increases or decreases in accordance with the amount of the inlet air flow of the engine, the operating conditions causing errors in the determination of catalyst deterioration can be detected by monitoring the amount of the inlet air flow of the engine.

In FIG. 13, it is determined that the engine is operated under conditions in which errors may occur in the determination of catalyst deterioration when the amount of inlet air flow of the engine Q is lower than a predetermined value $Q_0$ (step 1310), and the execution of the subroutine for determining catalyst deterioration is prohibited in such a case (steps 1312, 1313). $Q_0$ is set at a value corresponding to the amount of inlet air flow when the engine is operated under low load conditions. Since the value of $Q_0$ varies according to the type of engine and vehicle, it is preferable to determine the appropriate value for $Q_0$ experimentally.

According to the embodiments explained above, the error in the determination of catalyst deterioration due to changes in the operating conditions of the engine or the deterioration of the upstream $O_2$ sensor can be eliminated.

Although the invention has been described with reference to specific embodiments chosen for the purpose of illustration, it should be understood that numerous modifications could be applicable by those skilled in the art without departing from the basic concept and scope of the invention.

We claim:

1. A device for determining deterioration of a three-way catalyst disposed in an exhaust passage of an internal combustion engine, said engine comprising, an upstream air-fuel ratio sensor disposed in the exhaust passage upstream of said three-way catalyst for detecting an air-fuel ratio of the exhaust gas upstream of said three-way catalyst, a downstream air-fuel ratio sensor disposed in the exhaust passage downstream of said three-way catalyst for detecting the air-fuel ratio of the exhaust gas downstream of said three-way catalyst, and a feedback control means for controlling the air-fuel ratio of the engine by a feedback control based on, at least, the output of said upstream air-fuel ratio sensor, said device comprising:

a determining means for determining whether said three-way catalyst has deteriorated based on, at least, the output of said downstream air-fuel ratio sensor when the air-fuel ratio of the engine is controlled by said feedback control means;

a condition determining means for determining that the engine operating conditions are not appropriate for said determination of the deterioration of said three-way catalyst in which a period of a cycle of said feedback control of the air-fuel ratio by said feedback control means becomes larger than a value appropriate for said determination of the deterioration of said three-way catalyst; and, a means for prohibiting said determination of the deterioration of said three-way catalyst when said condition determining means determines that the engine operating conditions are not appropriate for said determination of the deterioration of said three-way catalyst, wherein said determining means for determining whether said three-way catalyst has deteriorated comprises a means for calculating lengths of the output signal response curves of said upstream and downstream air-fuel ratio sensors when the air-fuel ratio of the engine is feedback controlled by said feedback control means, a means for calculating areas surrounded by the output signal response curves and reference value lines of said upstream and downstream air-fuel ratio sensors when the air-fuel ratio of the engine is feedback controlled by said feedback control means, a means for calculating a ratio of said length of the output signal response curve of said upstream air-fuel ratio sensor to said length of the output signal response curve of said downstream air-fuel ratio sensor, a means for calculating a ratio of said area of the output signal response curve of said upstream air-fuel ratio sensor to said area of the output signal response curve of said downstream air-fuel ratio sensor, and determines whether said three-way catalyst has deteriorated in accordance with said ratio of the lengths and said ratio of said areas.

2. A device according to claim 1, wherein said condition determining means comprises a means for detecting the interval of reversals between a rich air-fuel ratio side and a lean air-fuel ratio side of the output signal of the upstream air-fuel ratio sensor, and determining that the engine operating conditions are not appropriate for said determination of the deterioration of the three-way catalyst when said interval of reversals of the output of the upstream air-fuel ratio sensor becomes longer than a predetermined value.

3. A device according to claim 1, wherein said condition determining means comprises a means for detecting an amount of intake air flow of the engine, and determining that the engine operating conditions are not appropriate for said determination of the deterioration of the three-way catalyst when said amount of intake air flow of the engine becomes smaller than a predetermined value.

* * * * *